(12) United States Patent
Mamadapur et al.

(10) Patent No.: US 11,263,117 B2
(45) Date of Patent: *Mar. 1, 2022

(54) SYSTEM FOR INTELLIGENT CODE UPDATE FOR A TEST AUTOMATION ENGINE

(71) Applicant: Bank of America Corporation, Charlotte, NC (US)

(72) Inventors: Krishna Rangarao Mamadapur, Pune (IN); Jigesh Rajendra Safary, Mumbai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 164 days.

This patent is subject to a terminal disclaimer.

(21) Appl. No.: 16/665,617

(22) Filed: Oct. 28, 2019

(65) Prior Publication Data
US 2021/0124674 A1 Apr. 29, 2021

(51) Int. Cl.
| | |
|---|---|
| *G06F 11/36* | (2006.01) |
| *G06N 20/00* | (2019.01) |
| *G06N 5/04* | (2006.01) |
| *G06N 5/02* | (2006.01) |
| *G06K 9/62* | (2006.01) |

(52) U.S. Cl.
CPC ...... *G06F 11/3684* (2013.01); *G06F 11/3664* (2013.01); *G06F 11/3688* (2013.01); *G06K 9/6267* (2013.01); *G06N 5/02* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | |
|---|---|---|
| 9,430,200 B1 | 8/2016 | Trofin et al. |
| 9,569,183 B2 | 2/2017 | Baluch et al. |

(Continued)

OTHER PUBLICATIONS

Rajesh Mathur, Scott Miles, Miao Du, "Adaptive Automation: Leveraging Machine Learning to Support Uninterrupted Automated Testing of Software Applications," Aug. 4, 2015, arXiv: 1508.00671 v1 [cs.SE], (Year: 2015).*

(Continued)

*Primary Examiner* — Andrew M. Lyons
(74) *Attorney, Agent, or Firm* — Moore & Van Allen PLLC; Anup Shrinivasan Iyer

(57) ABSTRACT

Systems, computer program products, and methods are described herein for intelligent code update for a test automation engine. The present invention is configured to receive, from a test automation engine, one or more exceptions associated with one or more automated test scripts; initiate an execution one or more machine learning algorithms on the one or more exceptions; classify the one or more exceptions into one or more exception types; generate an exception handling routine based on at least classifying the one or more exceptions into the one or more exception types; initiate an execution of the exception handling routine on the automated test script, wherein the exception handling routine comprises computer instructions for updating a source code of the one or more automated test scripts; and initiate an execution of the one or more updated automated test scripts on the test automation engine.

20 Claims, 3 Drawing Sheets

(56) References Cited

U.S. PATENT DOCUMENTS

| | | | |
|---|---|---|---|
| 9,652,220 | B2 | 5/2017 | Tammam et al. |
| 9,658,836 | B2 | 5/2017 | Mital et al. |
| 9,665,849 | B2 | 5/2017 | Casey |
| 9,733,915 | B2 | 8/2017 | Mital et al. |
| 9,733,993 | B2 | 8/2017 | Mital et al. |
| 9,785,484 | B2 | 10/2017 | Mital et al. |
| 10,198,252 | B2 | 2/2019 | Mital et al. |
| 10,268,476 | B2 | 4/2019 | Raundahl Gregersen et al. |
| 10,572,374 | B2* | 2/2020 | Sharma .................. G06N 20/00 |
| 10,572,449 | B2 | 2/2020 | Subramaniam et al. |
| 10,719,667 | B1 | 7/2020 | Roy |
| 10,977,166 | B1* | 4/2021 | Jaganmohan ........ G06K 9/6267 |
| 10,983,901 | B1* | 4/2021 | Pearce ................ G06F 11/3612 |
| 2015/0363292 | A1* | 12/2015 | Shiraishi ............... G06F 11/366 717/125 |
| 2015/0378864 | A1* | 12/2015 | Lensmar ............. G06F 11/3414 717/130 |
| 2018/0165264 | A1* | 6/2018 | Venkataraman ........ G06F 40/30 |
| 2018/0210824 | A1* | 7/2018 | Kochura ............. G06F 11/3664 |
| 2018/0370029 | A1* | 12/2018 | Hall ....................... G06N 20/00 |
| 2019/0079818 | A1* | 3/2019 | Handa ................. G06F 11/0778 |
| 2019/0108001 | A1* | 4/2019 | Hauser .................. G06F 11/362 |
| 2019/0266070 | A1* | 8/2019 | Bhandarkar ........ G06F 11/3644 |
| 2019/0340512 | A1* | 11/2019 | Vidal .................. G06F 11/3688 |
| 2019/0361767 | A1* | 11/2019 | Karthik ............... G06F 11/1469 |
| 2019/0384699 | A1* | 12/2019 | Arbon .................... G06N 3/006 |
| 2020/0097389 | A1* | 3/2020 | Smith ................. G06F 11/0775 |
| 2020/0147791 | A1* | 5/2020 | Safary ................ G06F 11/0736 |
| 2020/0387544 | A1* | 12/2020 | Smith ..................... G06F 16/93 |
| 2020/0409819 | A1* | 12/2020 | Acharyya ............. G06F 11/366 |

OTHER PUBLICATIONS

S. Thummalapenta et al., "Efficient and change-resilient test automation: An industrial case study," 2013 35th International Conference on Software Engineering (ICSE), 2013, pp. 1002-1011, doi: 10.1109/ICSE.2013.6606650. (Year: 2013).*

X. Zhu, B. Zhou, J. Li and Q. Gao, "A test automation solution on GUI functional test," 2008 6th IEEE International Conference on Industrial Informatics, 2008, pp. 1413-1418, doi: 10.1109/INDIN. 2008.4618325. (Year: 2008).*

* cited by examiner

SYSTEM FOR INTELLIGENT CODE UPDATE FOR A TEST AUTOMATION ENGINE

FIELD OF THE INVENTION

The present invention embraces a system for intelligent code update for a test automation engine.

BACKGROUND

In a traditional environment, testing gets completed at the end of a development cycle. But as more and more companies move toward a DevOps and continuous delivery model in which software is constantly in development and must always be deployment-ready, leaving testing until the end no longer works. Effective and efficient automated software testing is crucial to helping organizations deliver better software, faster—and, as an added benefit, automated testing done well can improve life for developers as they can get feedback on new code in minutes. While ensuring quality at all times, automated testing may require regular updates of the automated test scripts.

For this reason, there is a need for a system for intelligent code update for a test automation engine.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, system for intelligent code update for a test automation engine is presented. The system comprises: at least one non-transitory storage device; and at least one processing device coupled to the at least one non-transitory storage device, wherein the at least one processing device is configured to: receive, from a test automation engine, one or more exceptions associated with one or more automated test scripts; initiate an execution one or more machine learning algorithms on the one or more exceptions; classify the one or more exceptions into one or more exception types based on at least the execution of the one or more machine learning algorithms; generate an exception handling routine based on at least classifying the one or more exceptions into the one or more exception types; initiate an execution of the exception handling routine on the automated test script, wherein the exception handling routine comprises computer instructions for updating a source code of the one or more automated test scripts; and initiate an execution of the one or more updated automated test scripts on the test automation engine.

In some embodiments, the at least one processing device is further configured to: generate an ad-hoc exception handling routine based on at least classifying the one or more exceptions into the one or more exception types.

In some embodiments, the at least one processing device is further configured to: determine a pre-configured subroutine structure associated with the one or more exception types; receive information associated with the one or more exceptions; receive information associated with the one or more automated test scripts, wherein the information associated with the one or more automated test scripts further comprises information associated with one or more application components being tested by the one or more automated test scripts with the test automation engine; and generate the ad-hoc exception handling routine based on at least the pre-configured subroutine structure, the information associated with the one or more exceptions, and the information associated with the one or more automated test scripts.

In some embodiments, the at least one processing device is further configured to update a knowledge management database with the one or more exceptions based on at least the one or more exception types.

In some embodiments, the at least one processing device is further configured to: determine that the one or more exception types are associated with one or more predetermined exception handling routines, wherein determining further comprises determining a match between the one or more exception types associated with the one or more exceptions and the one or more exception types associated with one or more historical exceptions stored in the knowledge management database; retrieve the one or more predetermined exception handling routines from the knowledge management database; and initiate an execution of the of the one or more predetermined exception handling routines.

In some embodiments, the at least one processing device is further configured to: implement one or more machine learning algorithms on one or more training examples, wherein the one or more training examples comprises one or more inputs and a supervisory signal, wherein the one or more inputs comprises at least the one or more historical exceptions, wherein the supervisory signal comprises the one or more exception types; and generate an inferred function based on at least implementing the one or more machine learning algorithms on the one or more training examples to classify one or more new observations, wherein the one or more new observations comprises the one or more exceptions.

In some embodiments, the at least one processing device is further configured to classify, using the inferred function, the one or more exceptions into one or more exception types.

In some embodiments, the at least one processing device is further configured to: initiate an execution of a dashboard report script based on at least the knowledge management database, wherein the dashboard report script is configured to generate a graphical interface comprising one or more statistical graphs to visualize one or more incidences of the one or more exceptions, one or more exception types associated with the one or more exceptions, and one or more exception handling routines associated with the one or more exception types.

In another aspect, a computer implemented method for intelligent code update for a test automation engine is presented. The method comprises: receiving, using a computing device processor, from a test automation engine, one or more exceptions associated with one or more automated test scripts; initiating, using a computing device processor, an execution one or more machine learning algorithms on the one or more exceptions; classifying, using a computing device processor, the one or more exceptions into one or more exception types based on at least the execution of the one or more machine learning algorithms; generating, using a computing device processor, an exception handling routine based on at least classifying the one or more exceptions into the one or more exception types; initiating, using a computing device processor, an execution of the exception handling routine on the automated test script, wherein the exception handling routine comprises computer instructions for updating a source code of the one or more automated test scripts; and initiating, using a computing device processor, an execution of the one or more updated automated test scripts on the test automation engine.

In yet another aspect, a computer program product for intelligent code update for a test automation engine is presented. The computer program product comprising a non-transitory computer-readable medium comprising code causing a first apparatus to: receive, from a test automation engine, one or more exceptions associated with one or more automated test scripts; initiate an execution one or more machine learning algorithms on the one or more exceptions; classify the one or more exceptions into one or more exception types based on at least the execution of the one or more machine learning algorithms; generate an exception handling routine based on at least classifying the one or more exceptions into the one or more exception types; initiate an execution of the exception handling routine on the automated test script, wherein the exception handling routine comprises computer instructions for updating a source code of the one or more automated test scripts; and initiate an execution of the one or more updated automated test scripts on the test automation engine.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
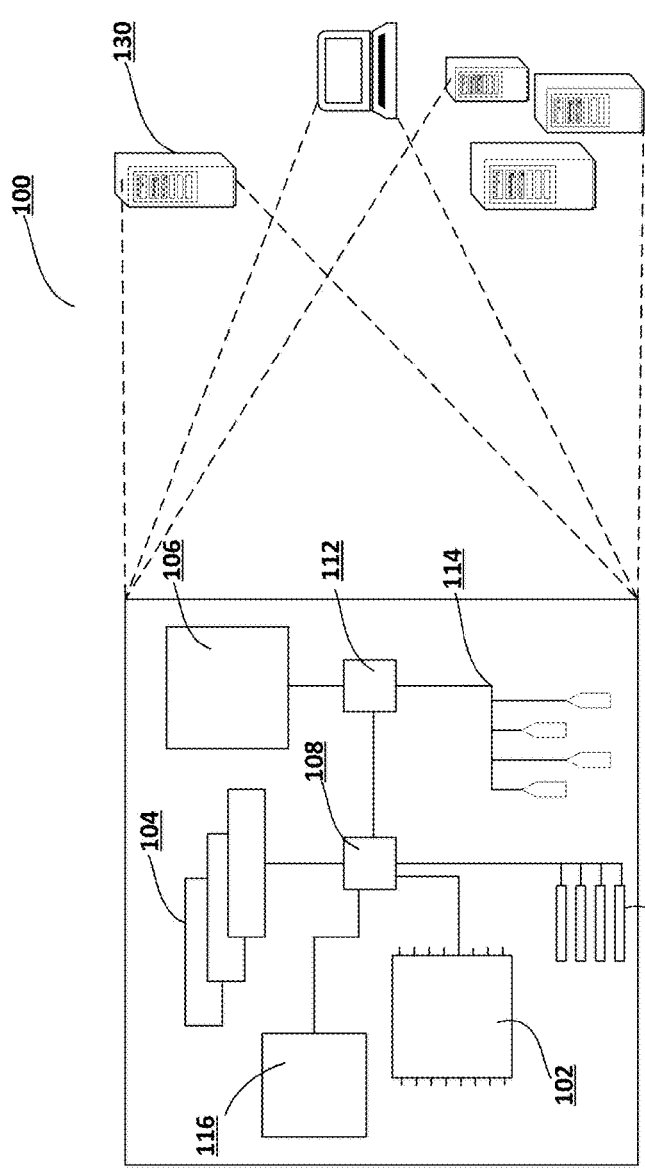
Figure 1:
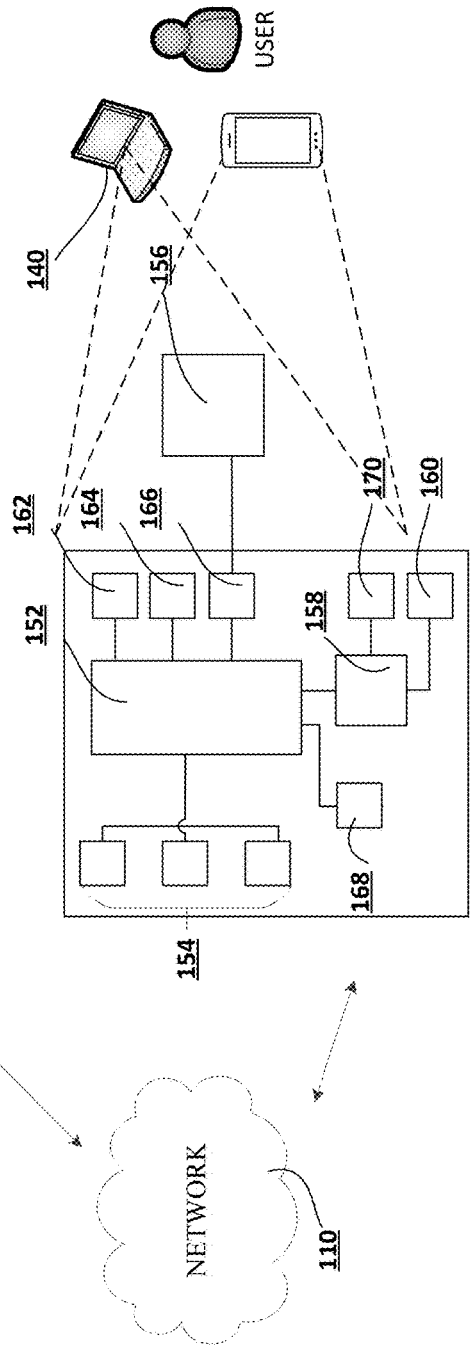
Figure 2:
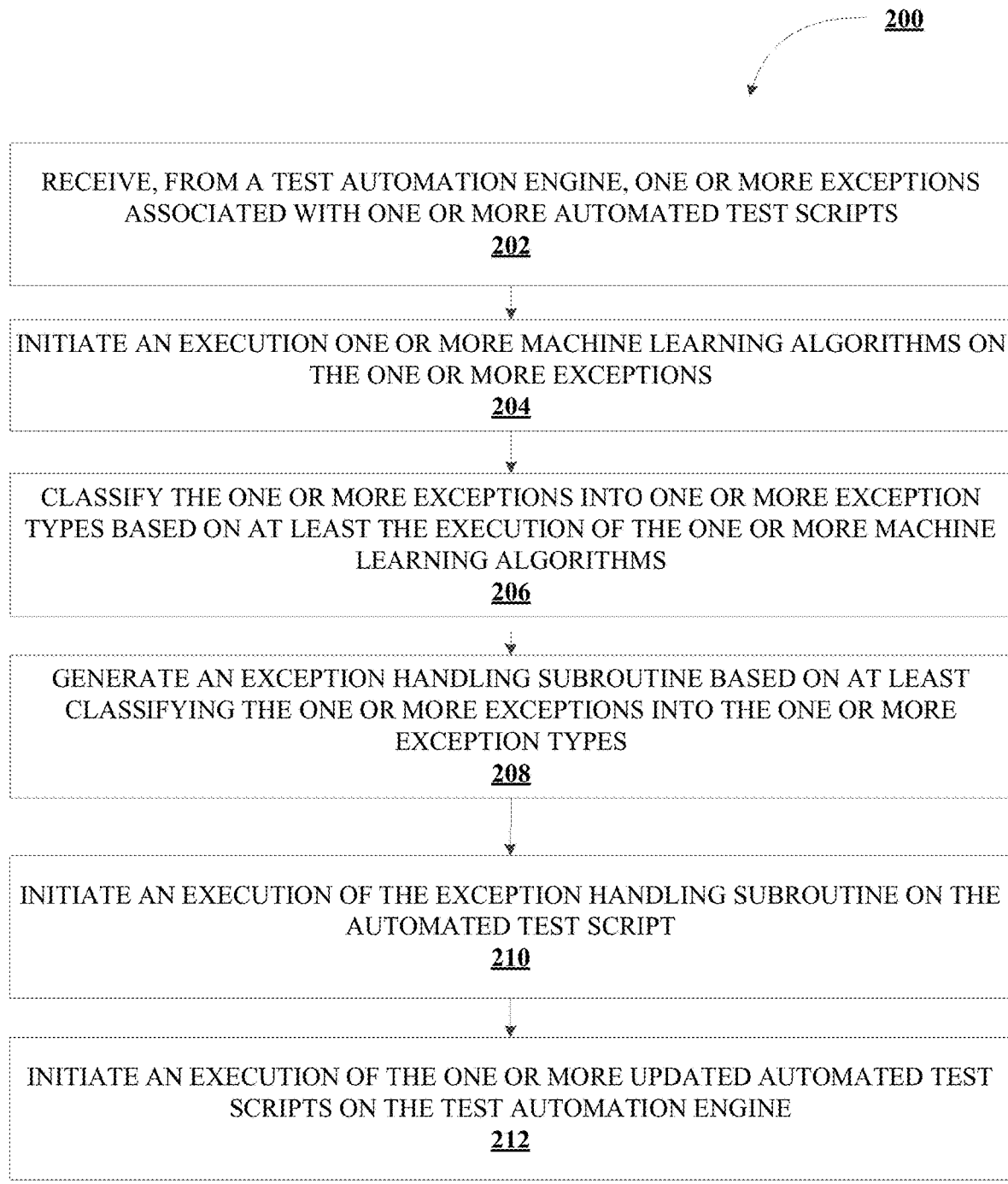
Figure 3:
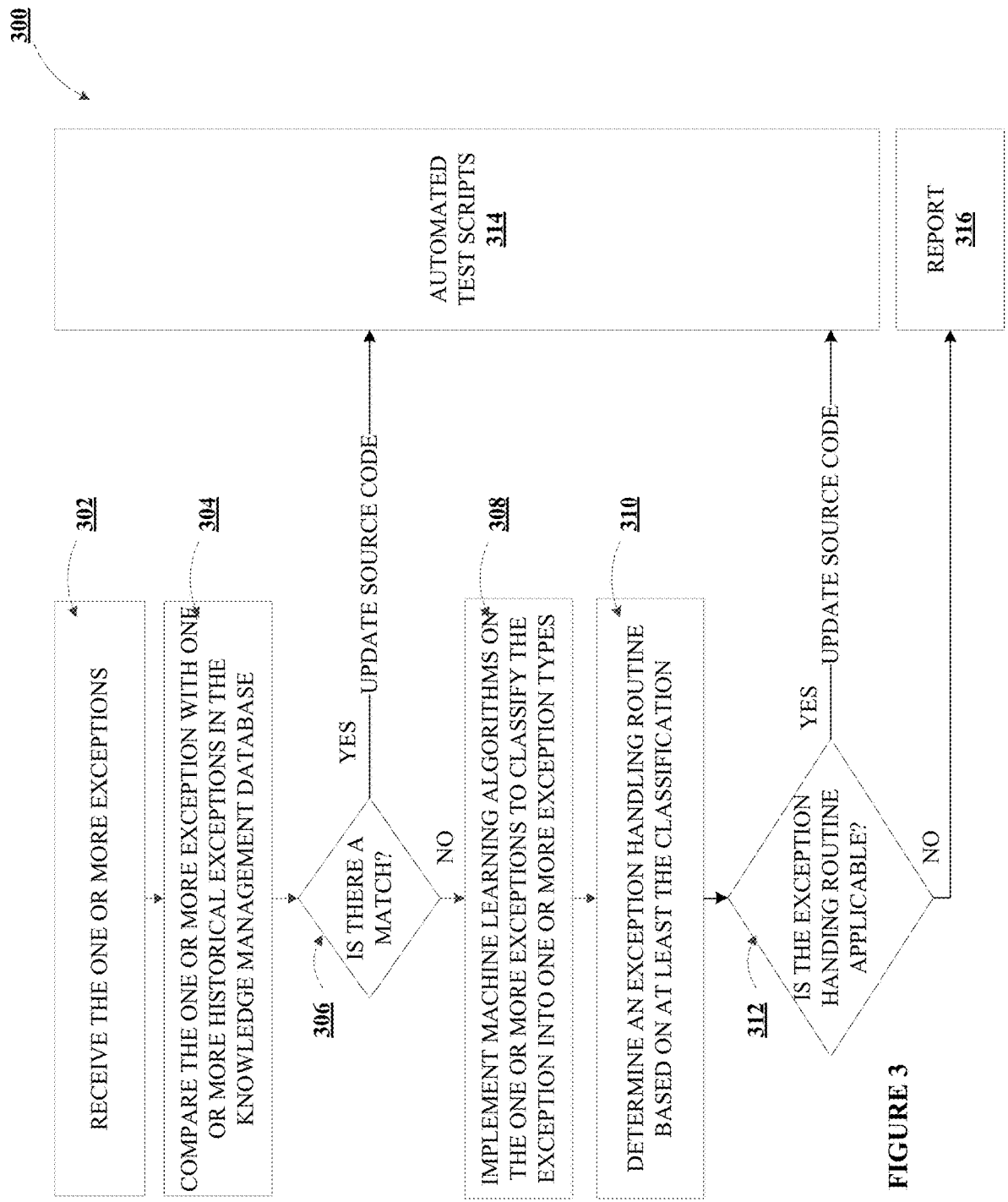

Having thus described embodiments of the invention in general terms, reference will now be made the accompanying drawings, wherein:

FIG. 1 illustrates technical components of a system for intelligent code update for a test automation engine, in accordance with an embodiment of the invention;

FIG. 2 illustrates a process flow for intelligent code update for a test automation engine, in accordance with an embodiment of the invention; and FIG. 3 illustrates a process flow for updating a source code of the automated test script, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more nodes of a computing cluster, a transmission of a requested task, or the like.

FIG. 1 presents an exemplary block diagram of the system environment for intelligent code update for a test automation engine 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer—or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols. Such communication may occur, for example, through radio-frequency transceiver 160. In addition, short-range communication may occur through other such transceivers (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

The move to agile has led many teams within entities to adopt an automated testing strategy. Automated testing is used by entities to validate whether an application is functioning appropriately and meeting requirements before it is released into production. To achieve this, the present invention uses automated test scripts to execute the examinations of the various features of the application. Automated test scripts may be executed continuously without the need for human intervention, they are easily repeatable, and often faster. Automated testing is useful in situations where the test is to be executed several times, for example as part of regression testing. Automated tests can be disadvantageous when it involves outdated test scripts automated test scripts, leading to incorrect testing or broken tests, resulting in exceptions. Therefore, automated testing may require regular updates of automated test scripts. while ensuring quality at all times.

FIG. 2 illustrates a process flow for intelligent code update for a test automation engine 200, in accordance with an embodiment of the invention. As shown in block 202, the process flow includes receiving, from a test automation engine, one or more exceptions associated with one or more automated test scripts. In some embodiments, the test automation engine may be used to automate some repetitive but necessary tasks in a formalized testing process already in place or perform additional testing that would be difficult to do manually. In one aspect, the test automation engine provides a single workspace for incorporating multiple automated test scripts and frameworks to map the automated test scripts to application functions to be tested.

In some embodiments, when automated test scripts fail, it results in the occurrence, during computation, of an exception—anomalous or exceptional conditions during testing. An exception typically occurs when an unexpected event happens that requires special processing. When an exception occurs, the system may be configured to receive the exception from the one or more automated test scripts.

Next, as shown in block 204, the process flow includes initiating an execution one or more machine learning algorithms on the one or more exceptions. In some embodiments, the advanced technology platform of the system may be configured to employ a robust ensemble of machine learning algorithms/models and related systems. Using these finely tuned and perpetually evolving and tunable machine learning algorithms/models, the system may be capable of classifying the exception into one of many exception types with high accuracy and, in some embodiments, in real-time (e.g., as the exceptions occur or shortly thereafter).

The machine learning algorithms/models function to identify or classify features of the collected historical exceptions into exception types. Accordingly, the machine learning algorithms/models may be implemented by a plurality of computing servers (e.g., a combination of web servers and private servers) that implement one or more ensembles of machine learning algorithms/models. The ensemble of machine learning models may include hundreds and/or thousands of machine learning models that work together to classify features of the historical exceptions and namely, to classify or detect features that may indicate its likelihood of association with an exception type. The machine learning algorithms/models may additionally utilize the information from the historical exceptions, exception types, and various other data sources (e.g., outputs of system 130, system 130 derived knowledge data, external entity-maintained data, etc.) to continuously improve or accurately tune weightings associated with features of the one or more of the machine learning algorithms/models defining the ensembles.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating data relevant to the system 130.

Next, as shown in block 206, the process flow includes classifying the one or more exceptions into one or more exception types based on at least the execution of the one or more machine learning algorithms. In some embodiments, the exception types may include, but is not limited to, predefined exceptions, non-predefined exceptions, built-in exceptions, checked exceptions, unchecked exceptions, user-defined exceptions, and/or the like. Each exception type may be associated with a specific exception handling routine to resolve the exception. Typically, categorizing each exception with an exception type and selecting an exception handling routine based on such an association requires manual intervention which involves time and resources that could be best allocated to other issues. The present invention provides the functional benefit of implementing machine learning algorithms/models to classify the exception into a specific exception type. In this regard, the system may be configured to receive information associated with the exception. In one aspect, the information associated with the exception may include information associated with the automated test scripts that originated the exception, information associated with application functions and/or features that were being tested by the automated test scripts prior to the incidence of the exception, information associated with the application testing environment, information associated with the test data used by the automated test script, information associated with a structure of the source code used in the test automation engine, information associated with resources allocated to the test automation engine, and/or the like. In some embodiments, a resource may include, but is not limited to, to computing resources that refer to elements of one or more computing devices (e.g., processor, memory, communication device, etc.) networks, or the like available to be used in the execution of end-to-end application testing. A computing resource may be used to refer to available processing, memory, and/or network bandwidth and/or power of an individual computing device as well a plurality of computing devices that may operate as a collective within the test automation engine (e.g., one or more computing devices operating in unison).

In some embodiments, executing the machine learning algorithms/models may include training the machine learning algorithm/model using the historical exceptions stored in the knowledge management database as inputs. For purposes of the invention, the phrase "historical exceptions" are exceptions received during a predetermined time in the past. Each exception received and processed, when moved to be stored in the knowledge management database is since referred to as a historical exception. In a supervised machine learning framework, historical exceptions previously classified into the various exception types are used as desired outputs to produce an inferred function which can then be used to classify new observations. In an unsupervised machine learning framework, the machine learning algorithms/models aim to find previously unknown patterns in the data without pre-existing labels. This method of identifying such patterns is also known as self-organization and allows modeling probability densities of given inputs. Once trained, the machine learning algorithms/models are now capable of classifying new observations. For purposes of the invention, new observations include any exception received from the execution of automated test scripts. In a supervised learning framework, the machine learning algorithm/model maps each new exception received to an exception type based on the inferred function generated by training the historical exceptions. In an unsupervised learning framework, the machine learning algorithm/model generates the inferred function based on identifying commonalities in the historical exceptions and classifies each new exception into an exception type based on the presence or absence of such commonalities in any new exception received.

Next, as shown in block 208, the process flow includes generating an exception handling routine based on at least classifying the one or more exceptions into the one or more exception types. In some embodiments, the system may be configured to generate an ad-hoc exception handling routine based on at least the exception type. In this regard, the system may be configured to determine a pre-configured subroutine structure associated with the exception type. The system may then be configured to receive information associated with the exceptions. In one aspect, the information associated with the exceptions may include automated test script subroutines that have failed. In addition, the system may be configured to receive information associated with the automated test scripts. In one aspect, the information associated with the automated test scripts includes information associated with various application components and/or functionalities being tested by the automated test scripts. In response, the system may be configured to generate the ad-hoc exception handling routine based on at least the pre-configured subroutine structure, the information associated with the exceptions, and the information associated with the automated test scripts. Once generated, the system may be configured to transmit control signals configured to cause the exception handling bot to execute the ad-hoc exception handling routine to resolve the exceptions.

Next, as shown in block 210, the process flow includes initiating an execution of the exception handling routine on the automated test script. In some embodiments, the exception handling routine may include computer instructions for updating a source code of the automated test scripts. In one aspect, the system may be configured to generate the computer instructions based on information associated with the exceptions and the exception types. In this regard, the computer instructions include a high level rules and/or concepts used to update the source code of the automated test scripts. In another aspect, the system may be configured to generate an ontological model such as a template and is accomplished with a programming tool such as a template processor, or an integrated development environment. In some embodiments, ontology is an explicit specification of conceptualization that includes a formal representation of the knowledge by a set of concepts within a domain and the relationships between those concepts.

Next, as shown in block 212, the process flow includes initiating an execution of the one or more updated automated test scripts on the test automation engine. In some embodiments, the system may be configured to continuously monitor the test automation engine to determine any incidence of exceptions. In one aspect, while the exceptions previously received may have been resolved, the automated test script may cause a different exception. In such situations, the system may be configured to receive such an exception and re-execute the process flows described herein to resolve the exception. In some embodiments, in addition to initiating an execution of the updated automated test scripts, the system may be configured to determine whether updating the automated test scripts has resolved the exception. In this regard, the system may be configured continuously monitor the execution of the updated automated test scripts to completion.

FIG. 3 illustrates a process flow for updating a source code of the automated test script 300, in accordance with an embodiment of the invention. As shown in block 302, the process flow includes receiving one or more exceptions. As described herein, an exception typically occurs when an unexpected event happens that requires special processing. In one aspect, the exception may be due to pre-allocation of as much memory as is available in the system. This may be a result of a dynamically allocated array growing too large, or the instantiation of a large number of objects. In another aspect, the exception may be due to the array being accessed containing fewer elements than expected. For example, attempting to access the $11^{th}$ element of an array dimensioned for 10 elements. In yet another aspect, the exception may be due to an attempt to create a string object in a memory array that is already full. In some embodiments, this could be a result of a dynamically allocated array growing too large, or the instantiation of a large number of objects. In yet another aspect, the exception may be due to an attempt to change a number of elements in an array of constant size, where arrays declared as dynamic, or arrays with specific variables can be temporarily locked. In yet another aspect, the exception may be due to any script compilation errors.

Next, as shown in block 304, the process flow includes comparing the one or more exceptions with one or more historical exceptions in the knowledge management database. In some embodiments, the knowledge management database includes exception handling routines associated with each exception type. In one aspect, each of these exception handling routines that have been previously identified and executed manually by the user to resolve historical exceptions categorized within that exception type.

Next, as shown in block 306, the process flow includes determining whether there is a match between the exception and the historical exceptions in the knowledge management database. If there is a match, the system may be configured to update the source code associated with the automated test script 314. By storing the historical exceptions, exception types, and the exception handling routines implemented to resolve the historical exceptions, the knowledge management database may be populated to enable the system to access the exception handling routines based on the exception type to resolve the exception. As described herein, the exception handling routine may include computer instructions for updating a source code of the one or more automated test scripts.

Next, as shown in block 308, the process flow includes implementing machine learning algorithms on the one or more exceptions to classify the exception into one or more exception types. In some embodiments, each exception, when received is typically in an unstructured format. Examples of unstructured data include images, audio, videos, e-mails, spreadsheets, and word processing documents—essentially, digital objects stored as files. In one aspect, the exception received in an unstructured format may need to be transformed into a structured format. Transforming unstructured data into structured data may include grouping aspects of the unstructured data into relations or classes based upon shared characteristics. The unstructured data is generally allocated attributes (data descriptions) related to the classes within each group to help in ordering and logically grouping. In addition, the unstructured data can be described by predefined formats (string or value) with predefined lengths of characters. Once transformed, the exceptions, now in a structured data format, are then processed and eventually stored in the knowledge management database. As described herein, processing the exception includes implementing machine learning algorithms to classify the exception into an exception type.

As described herein, implementing machine learning algorithms/models for classification involves two distinct phases: training and classification. During the training phase, the machine learning algorithms/models are trained using the historical exceptions in the knowledge management database. In some embodiments, the machine learning algorithms/models may be trained using historical exceptions that have been transformed from an unstructured format to a structured format. In some other embodiments, the machine learning algorithms/models may be trained using the historical exceptions in an unstructured format. In this regard, the machine learning algorithms/models are programmed to identify some underlying structure in the data. A typical example is clustering, finding groups of data points that have some similarity. Another example is dimension reduction or information compression through autoencoders that are neural networks with a bottleneck. In yet another embodiment, the machine learning algorithms/models may be trained using historical exceptions that are stored in a combination of unstructured format and structured format.

As indicated above, the machine learning algorithms/models are configured to be continuously learning. In this regard, in addition to classifying the exception into an exception type, the system may be configured to update the knowledge management database with the received exception and its associated exception type. In some embodiments, in response to classifying the exception to an exception type, the system may be configured to initiate a user interface for display on a user device indicating the exception and its corresponding classification. In one aspect, the user interface may also include an authorization request for the user to approve the classification so that the classified exception can be stored in the knowledge management database. In some other embodiments, in response to classifying the exception to an exception type, the system may be configured to automatically store the recently classified exception and its corresponding exception type in the knowledge management database.

Next, as shown in block 310, the process flow includes determining an exception handling routine based on at least the classification. In some embodiments, the exception handling routine may be stored in a solutions and diagnostic rules database. In some other embodiments, the exception handling routine may be stored in the knowledge management database. In yet another embodiment, the portions of the exception handling routine may be stored in the knowledge management database while the remaining portion may be stored in the solutions and diagnostic rules database. In still other embodiments, when generating the exception handling routine, the system may be configured to establish a communication link with a plurality of databases which may have the necessary content to resolve the exceptions, and combine the content to generate the exception handling routine. Accordingly, in response to classifying the exception into an exception type, the system may be configured to determine an exception handling routine associated with the exception type to resolve the exception. As described herein, the exception handling routine may include computer instructions for updating a source code of the one or more automated test scripts. In one aspect, the system may be configured to establish a communication link with the solutions and diagnostic rules database to retrieve the exception handling routine based on the exception type. In some embodiments, the exception handling routine may include a sequence of actions to be performed to resolve the exception. Depending on the execution type, these actions may include a number of predetermined, repeatable sequences that are executed by the user. In such cases, system may be configured to implement configurable software components named "bots" to perform repetitive tasks that can be assigned and controlled by the user. When initiated, each exception handling bot may be configured to interact with the automated test scripts, and in some cases, the underlying application being tested to resolve the one or more exceptions.

Next, as shown in block 312, the process flow includes determining whether the exception handling routine is applicable to resolve the one or more exceptions. In this regard, the system may be configured to determine whether the application handling routine has successfully resolved the exception. In some embodiments, this involves initiating a re-execution of the automated test scripts that originated the exception and determining whether the exceptions recur. If the exceptions do not recur, the exception handling routine is considered applicable. If the exceptions recur, the exception handling routine is considered inapplicable.

If the exception handling routine is applicable, the system may be configured to update the source code associated with the automated test scripts 314. If not, the system may be configured to generate a report 316. In some embodiments, the system may be configured to initiate an execution of a dashboard report script based on at least the knowledge management database, wherein the dashboard report script is configured to generate a graphical interface comprising one or more statistical graphs to visualize one or more incidences of the one or more exceptions, one or more exception types associated with the one or more exceptions, and one or more exception handling routines associated with the one or more exception types. In addition, report may include a graphical representation of where are the maximum exceptions coming from and why, what are the most number of exceptions in each exception type, which task in the automated test script is taking more time to execute, and any trend/correlation analysis between different variables. In some embodiments, the dashboard report script may be configured to update the knowledge management database and the solutions and diagnostic rules database to record any previously encountered exceptions and the exception handling routines generated to resolve them. In doing so, should the same exception be encountered again in the future, the test automation engine may be configured to retrieve the corresponding exception handling routine to resolve the exception without the need for manual intervention.

In some embodiments, in response to determining that the exception handling routine is inapplicable, the system may be configured to escalate the exception to a user for manual intervention. This involves initiating a user interface for display on the user device indicating at least the exception, the classified exception type, and the corresponding exception handling routine. In response, the system may be configured to receive a user input to either re-classify the exception to another exception type, select an alternative exception handling routine to be implemented to resolve the exception, and/or generate an alternative exception handling routine. In response to receiving the user input, the system may be configured to update the knowledge management database based on the user input and execute the alternative exception handling routine.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for intelligent code update for a test automation engine, the system comprising:
    at least one non-transitory storage device; and
    at least one processing device coupled to the at least one non-transitory storage device, wherein the at least one processing device is configured to:
        receive, from a test automation engine, one or more exceptions associated with one or more automated test scripts;

receive information associated with the one or more exceptions, wherein the information comprises at least information associated with at least one of the one or more automated test scripts that originated the exception, information associated with application functions and/or features that were being tested by the at least one of the one or more automated test scripts prior to the incidence of the exception, information associated with a testing environment, information associated with test data used by the at least one of the one or more automated test scripts, information associated with a structure of a source code used in the test automation engine, information associated with resources allocated to the test automation engine;

initiate an execution of one or more machine learning algorithms on the information associated with the one or more exceptions;

classify the one or more exceptions into one or more exception types based on at least the execution of the one or more machine learning algorithms, wherein the one or more exception types comprises at least predefined exceptions, non-predefined exceptions, built-in exceptions, checked exceptions, unchecked exceptions, and/or user-defined exceptions;

generate an exception handling routine based on at least classifying the one or more exceptions into the one or more exception types;

initiate an execution of the exception handling routine on the automated test script, wherein the exception handling routine comprises computer instructions for updating a source code of the one or more automated test scripts; and initiate an execution of the one or more updated automated test scripts on the test automation engine.

2. The system of claim 1, wherein the at least one processing device is further configured to:
generate an ad-hoc exception handling routine based on at least classifying the one or more exceptions into the one or more exception types.

3. The system of claim 2, wherein the at least one processing device is further configured to:
determine a pre-configured subroutine structure associated with the one or more exception types;
receive information associated with the one or more automated test scripts, wherein the information associated with the one or more automated test scripts further comprises information associated with one or more application components being tested by the one or more automated test scripts with the test automation engine; and
generate the ad-hoc exception handling routine based on at least the pre-configured subroutine structure, the information associated with the one or more exceptions, and the information associated with the one or more automated test scripts.

4. The system of claim 3, wherein the at least one processing device is further configured to update a knowledge management database with the one or more exceptions based on at least the one or more exception types.

5. The system of claim 4, wherein the at least one processing device is further configured to:
determine that the one or more exception types are associated with one or more predetermined exception handling routines, wherein determining further comprises determining a match between the one or more exception types associated with the one or more exceptions and the one or more exception types associated with one or more historical exceptions stored in the knowledge management database;
retrieve the one or more predetermined exception handling routines from the knowledge management database; and
initiate an execution of the of the one or more predetermined exception handling routines.

6. The system of claim 5, wherein the at least one processing device is further configured to:
implement one or more machine learning algorithms on one or more training examples, wherein the one or more training examples comprises one or more inputs and a supervisory signal, wherein the one or more inputs comprises at least the one or more historical exceptions, wherein the supervisory signal comprises the one or more exception types; and
generate an inferred function based on at least implementing the one or more machine learning algorithms on the one or more training examples to classify one or more new observations, wherein the one or more new observations comprises the one or more exceptions.

7. The system of claim 6, wherein the at least one processing device is further configured to classify, using the inferred function, the one or more exceptions into one or more exception types.

8. The system of claim 4, wherein the at least one processing device is further configured to:
initiate an execution of a dashboard report script based on at least the knowledge management database, wherein the dashboard report script is configured to generate a graphical interface comprising one or more statistical graphs to visualize one or more incidences of the one or more exceptions, one or more exception types associated with the one or more exceptions, and one or more exception handling routines associated with the one or more exception types.

9. A computer implemented method for intelligent code update for a test automation engine, the method comprising:
receiving, using a computing device processor, from a test automation engine, one or more exceptions associated with one or more automated test scripts;
receiving, using a computing device processor, information associated with the one or more exceptions, wherein the information comprises at least information associated with at least one of the one or more automated test scripts that originated the exception, information associated with application functions and/or features that were being tested by the at least one of the one or more automated test scripts prior to the incidence of the exception, information associated with a testing environment, information associated with test data used by the at least one of the one or more automated test scripts, information associated with a structure of a source code used in the test automation engine, information associated with resources allocated to the test automation engine;
initiating, using a computing device processor, an execution of one or more machine learning algorithms on the information associated with the one or more exceptions;
classifying, using a computing device processor, the one or more exceptions into one or more exception types based on at least the execution of the one or more machine learning algorithms, wherein the one or more exception types comprises at least predefined exceptions, non-predefined exceptions, built-in exceptions, checked exceptions, unchecked exceptions, and/or user-defined exceptions;

generating, using a computing device processor, an exception handling routine based on at least classifying the one or more exceptions into the one or more exception types;

initiating, using a computing device processor, an execution of the exception handling routine on the automated test script, wherein the exception handling routine comprises computer instructions for updating a source code of the one or more automated test scripts; and initiating, using a computing device processor, an execution of the one or more updated automated test scripts on the test automation engine.

10. The method of claim 9, wherein the method further comprises: generating an ad-hoc exception handling routine based on at least classifying the one or more exceptions into the one or more exception types.

11. The method of claim 10, wherein the method further comprises:

determining a pre-configured subroutine structure associated with the one or more exception types;

receiving information associated with the one or more automated test scripts, wherein the information associated with the one or more automated test scripts further comprises information associated with one or more application components being tested by the one or more automated test scripts with the test automation engine; and generating the ad-hoc exception handling routine based on at least the pre-configured subroutine structure, the information associated with the one or more exceptions, and the information associated with the one or more automated test scripts.

12. The method of claim 11, wherein the method further comprises updating a knowledge management database with the one or more exceptions based on at least the one or more exception types.

13. The method of claim 12, wherein the method further comprises:

determining that the one or more exception types are associated with one or more predetermined exception handling routines, wherein determining further comprises determining a match between the one or more exception types associated with the one or more exceptions and the one or more exception types associated with one or more historical exceptions stored in the knowledge management database;

retrieving the one or more predetermined exception handling routines from the knowledge management database; and initiating an execution of the of the one or more predetermined exception handling routines.

14. The method of claim 13, wherein the method further comprises:

implementing one or more machine learning algorithms on one or more training examples, wherein the one or more training examples comprises one or more inputs and a supervisory signal, wherein the one or more inputs comprises at least the one or more historical exceptions, wherein the supervisory signal comprises the one or more exception types; and generating an inferred function based on at least implementing the one or more machine learning algorithms on the one or more training examples to classify one or more new observations, wherein the one or more new observations comprises the one or more exceptions.

15. The method of claim 14, wherein the method further comprises classifying, using the inferred function, the one or more exceptions into one or more exception types.

16. The method of claim 12, wherein the method further comprises:

initiating an execution of a dashboard report script based on at least the knowledge management database, wherein the dashboard report script is configured to generate a graphical interface comprising one or more statistical graphs to visualize one or more incidences of the one or more exceptions, one or more exception types associated with the one or more exceptions, and one or more exception handling routines associated with the one or more exception types.

17. A computer program product for intelligent code update for a test automation engine, the computer program product comprising a non-transitory computer-readable medium comprising code causing a first apparatus to:

receive, from a test automation engine, one or more exceptions associated with one or more automated test scripts;

receive information associated with the one or more exceptions, wherein the information comprises at least information associated with at least one of the one or more automated test scripts that originated the exception, information associated with application functions and/or features that were being tested by the at least one of the one or more automated test scripts prior to the incidence of the exception, information associated with a testing environment, information associated with test data used by the at least one of the one or more automated test scripts, information associated with a structure of a source code used in the test automation engine, information associated with resources allocated to the test automation engine;

initiate an execution of one or more machine learning algorithms on the information associated with the one or more exceptions;

classify the one or more exceptions into one or more exception types based on at least the execution of the one or more machine learning algorithms, wherein the one or more exception types comprises at least pre-defined exceptions, non-predefined exceptions, built-in exceptions, checked exceptions, unchecked exceptions, and/or user-defined exceptions;

generate an exception handling routine based on at least classifying the one or more exceptions into the one or more exception types;

initiate an execution of the exception handling routine on the automated test script, wherein the exception handling routine comprises computer instructions for updating a source code of the one or more automated test scripts; and initiate an execution of the one or more updated automated test scripts on the test automation engine.

18. The computer program product of claim 17, wherein the first apparatus is further configured to generate an ad-hoc exception handling routine based on at least classifying the one or more exceptions into the one or more exception types.

19. The computer program product of claim 18, wherein the first apparatus is further configured to:

determine a pre-configured subroutine structure associated with the one or more exception types;

receive information associated with the one or more automated test scripts, wherein the information associated with the one or more automated test scripts further comprises information associated with one or more application components being tested by the one or more automated test scripts with the test automation engine; and generate the ad-hoc exception handling routine based on at least the pre-configured subroutine structure, the information associated with the one or more exceptions, and the information associated with the one or more automated test scripts.

20. The computer program product of claim 19, wherein the first apparatus is further configured to update a knowledge management database with the one or more exceptions based on at least the one or more exception types.

* * * * *